US010821506B2

(12) United States Patent
Izumi et al.

(10) Patent No.: US 10,821,506 B2
(45) Date of Patent: Nov. 3, 2020

(54) METHOD FOR PRODUCING SILVER NANOPARTICLE DISPERSION AND METHOD FOR PRODUCING SILVER NANOPARTICLE INK

(71) Applicant: NATIONAL UNIVERSITY CORPORATION YAMAGATA UNIVERSITY, Yamagata-shi, Yamagata (JP)

(72) Inventors: Konami Izumi, Yamagata (JP); Daisuke Kumaki, Yamagata (JP); Shizuo Tokito, Yamagata (JP); Daisuke Shiokawa, Yamagata (JP)

(73) Assignee: NATIONAL UNIVERSITY CORPORATION YAMAGATA UNIVERSITY, Yamagata (JP)

( * ) Notice: Subject to any disclaimer, the term of this patent is extended or adjusted under 35 U.S.C. 154(b) by 92 days.

(21) Appl. No.: 15/575,013

(22) PCT Filed: May 20, 2016

(86) PCT No.: PCT/JP2016/002480
§ 371 (c)(1),
(2) Date: Feb. 20, 2018

(87) PCT Pub. No.: WO2016/185728
PCT Pub. Date: Nov. 24, 2016

(65) Prior Publication Data
US 2018/0354031 A1 Dec. 13, 2018

(30) Foreign Application Priority Data
May 20, 2015 (JP) .................. 2015-102815

(51) Int. Cl.
| B22F 1/00 | (2006.01) |
| C08J 3/09 | (2006.01) |
| C09D 11/52 | (2014.01) |
| H01M 4/54 | (2006.01) |
| B82Y 30/00 | (2011.01) |
| B82Y 40/00 | (2011.01) |
| H01B 1/22 | (2006.01) |
| B22F 9/30 | (2006.01) |
| H01B 13/00 | (2006.01) |
| H01M 4/04 | (2006.01) |

(52) U.S. Cl.
CPC .......... *B22F 1/0022* (2013.01); *B22F 1/0059* (2013.01); *B22F 9/30* (2013.01); *B82Y 30/00* (2013.01); *B82Y 40/00* (2013.01); *C08J 3/097* (2013.01); *C09D 11/52* (2013.01); *H01B 1/22* (2013.01); *H01B 13/00* (2013.01); *H01M 4/0471* (2013.01); *H01M 4/54* (2013.01); *B22F 2301/255* (2013.01)

(58) Field of Classification Search
None
See application file for complete search history.

(56) References Cited

U.S. PATENT DOCUMENTS

| 8,999,206 B2 | 4/2015 | Nakamoto et al. |
| 2004/0004209 A1 | 1/2004 | Matsuba et al. |
| 2009/0214764 A1 | 8/2009 | Li et al. |
| 2010/0189901 A1 | 7/2010 | Chung et al. |
| 2012/0043510 A1 | 2/2012 | Kurihara et al. |
| 2015/0231698 A1* | 8/2015 | Kurihara ............... B22F 1/0018 252/514 |
| 2015/0232709 A1 | 8/2015 | Matsui et al. |

FOREIGN PATENT DOCUMENTS

| CN | 1261268 C | * 6/2006 |
| CN | 104308180 | * 1/2015 |
| JP | 4155821 B2 | 9/2008 |
| JP | 2009221606 | 10/2009 |
| JP | 2010500475 A | 1/2010 |
| JP | 2010209366 A | 9/2010 |
| JP | 4641384 B2 | 3/2011 |
| JP | 5495465 B1 | 5/2014 |
| JP | 5574761 B2 | 8/2014 |
| WO | 2007148460 A1 | 12/2007 |
| WO | 2008/127282 A2 | 10/2008 |
| WO | WO-2014021461 A1 * | 2/2014 ............ B22F 1/0018 |

(Continued)

OTHER PUBLICATIONS

English Translation of WO Patent 2015/025837 Feb. 26, 2015 (Year: 2015).*
Hong Gao et al., "In-situ preparation of epoxy/silver nanocomposites by thermal decomposition of silver imidazole complex," Materials Letters, Jul. 2011, vol. 65, No. 23, pp. 3529-3532, Amsterdam, Netherlands.
Itoh Mitsunori et al., "Direct Transformation into Silver Nanoparticles via Thermal Decomposition of Oxalate-Bridging Silver Oleylamine Complexes," Journal of Nanoscience and Nanotechnology, Nov. 2009, vol. 9, No. 11, pp. 6655-6660.
Extended European Search Report issued for European Patent Application No. 16796123.4, dated Dec. 13, 2018, 10 pages.
International Search Report issued for International Application No. PCT/JP2016/002480, dated Aug. 9, 2016, 5 pages including English translation.

*Primary Examiner* — Tanisha Diggs
(74) *Attorney, Agent, or Firm* — Hamre, Schumann, Mueller & Larson, P.C.

(57) ABSTRACT

A method for producing a silver nanoparticle dispersion according to the present invention includes the steps of mixing an amine compound, a resin, and a silver salt to yield a complex compound; and heating and decomposing the complex compound to form silver nanoparticles. A silver nanoparticle ink can be obtained by adding an organic solvent to the silver nanoparticle dispersion obtained by this method. The resin includes, for example, a polymer exhibiting viscosity at a temperature within the range of 20° C. to 50° C. or a high molecular weight compound exhibiting viscosity at a temperature within the range of 20° C. to 50° C.

13 Claims, 8 Drawing Sheets

(56) References Cited

FOREIGN PATENT DOCUMENTS

| WO | WO-2014030310 A1 | * | 2/2014 | ............... H01B 1/22 |
| WO | 2015025837 A1 | | 2/2015 | |

* cited by examiner

METHOD FOR PRODUCING SILVER NANOPARTICLE DISPERSION AND METHOD FOR PRODUCING SILVER NANOPARTICLE INK

TECHNICAL FIELD

The present invention relates to a method for producing a silver nanoparticle dispersion and a method for producing a silver nanoparticle ink.

BACKGROUND ART

In recent years, nanometer-sized materials have been actively developed, and there has been a growing expectation for material characteristics enhanced by size effects of such materials. Particularly, nanometer-sized metal particles (hereinafter referred to as metal nanoparticles) decrease their melting point with reduction in particle size, and they can be sintered even at a temperature as low as 100° C. to 200° C. Therefore, metal nanoparticles are being put into practical use in various ways in the field of production of electronic devices. Silver nanoparticles are considered one of the most convenient nanomaterials because of their ease of production and the nature of silver reducible by heating at 150° C. in air.

For example, in the field of printed electronics where electronic devices are produced by printing, a silver nanoparticle ink (an ink containing silver nanoparticles) is attracting attention as an electrically-conductive ink that exhibits high electrical conductivity. A silver nanoparticle ink can be obtained by dispersing silver nanoparticles in a solvent.

Examples of printing devices used in the production of electronic devices include a screen printer, gravure offset printer, flexographic printer, letterpress reverse printer, and inkjet printer. Silver nanoparticle inks to be used in these printers need to have ink characteristics (such as viscosity and surface energy) suitable for each printing device.

CITATION LIST

Patent Literature

Patent Literature 1: JP 2010-209366 A
Patent Literature 2: JP 5574761 B2
Patent Literature 3: JP 4641384 B2

SUMMARY OF INVENTION

Technical Problem

As described in Patent Literature 1, silver nanoparticles can be obtained by reducing a silver salt. This method is called a liquid-phase reduction method and currently in common use. The liquid-phase reduction method, however, uses a large amount of dispersion solvent containing a highly toxic reducing agent. Because of this, the liquid-phase reduction method has problems in terms of an environmental impact and cost.

Meanwhile, Patent Literature 2 discloses a method for producing silver nanoparticles that can be sintered at a low temperature through heat decomposition of a silver complex. This method is called a complex decomposition method. The complex decomposition method is excellent in terms of its capability of efficiently producing high-quality silver nanoparticles without using a reducing agent.

A silver nanoparticle ink usable in various printing devices can be obtained by dispersing silver nanoparticles produced by either of the above methods in an appropriate solvent. However, just dispersing silver nanoparticles produced by the conventional methods in a solvent only produces a silver nanoparticle ink having a very low viscosity. It is difficult to use such a silver nanoparticle ink in a screen printer and gravure offset printer that require high viscosity.

To solve this problem, Patent Literature 3 describes addition of a resin (polymer material) to a silver nanoparticle ink to increase its viscosity.

However, it is difficult to uniformly disperse a resin having a high viscosity and silver nanoparticles in a solvent. There is another problem in that the silver nanoparticles tend to fuse with each other during kneading, leading ink characteristics to change. Moreover, if fine conductive lines are formed using an ink in which silver nanoparticles and a resin are mixed non-uniformly, the resin component with low electrical conductivity can cause phase separation and be a factor of disconnection.

The present invention aims to provide a silver nanoparticle ink having wide-ranging viscosity characteristics applicable to various printing devices, the silver nanoparticle ink containing silver nanoparticles and a resin uniformly dispersed in a solvent. The present invention also aims to provide a silver nanoparticle dispersion suitable for producing such a silver nanoparticle ink.

Solution to Problem

That is, the present invention provides a method for producing a silver nanoparticle dispersion, including the steps of mixing an amine compound, a resin, and a silver salt to yield a complex compound; and heating and decomposing the complex compound to form silver nanoparticles.

Advantageous Effects of Invention

A silver nanoparticle ink containing silver nanoparticles and a resin uniformly dispersed in a solvent can be easily produced using a silver nanoparticle dispersion obtained by the above method. A silver nanoparticle ink having wide-ranging viscosity characteristics applicable to various printing devices can be obtained by properly adjusting, for example, the kind of the solvent and the concentration of the silver nanoparticles.

DESCRIPTION OF EMBODIMENTS

Figure 1:
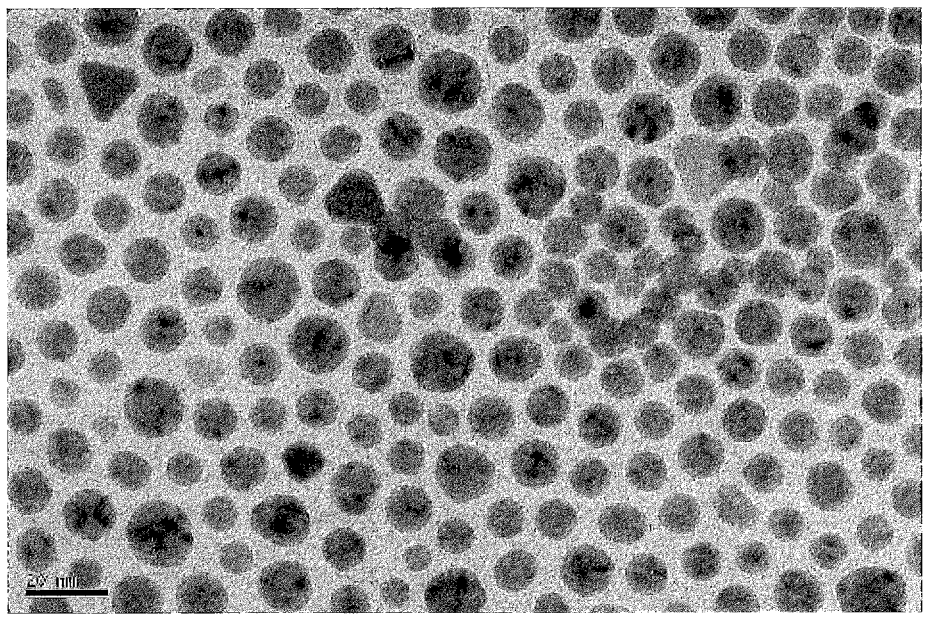
FIG. 1 shows a TEM image of silver nanoparticles of Example 1.

Silver nanoparticles of the present embodiment can be formed by mixing an amine compound, a resin, and a silver salt to yield a complex compound, then heating and decomposing the complex compound. After synthesized, the silver nanoparticles are added to a solvent such as an alcohol, hydrocarbon organic solvent, aromatic organic solvent, ketone organic solvent, and mixed solvent containing two or more thereof and are dispersed in the solvent. A silver nanoparticle ink having a properly controlled viscosity can be obtained in this manner.

According to the present embodiment, the silver nanoparticles are formed by heating and decomposing the complex compound (silver complex) in a system containing a resin. In other words, a resin is contained in a raw material mixture for forming the complex compound. The resultant product is a silver nanoparticle dispersion including the silver nanoparticles and resin. In the silver nanoparticle dispersion, the silver nanoparticles and resin are uniformly mixed. Each silver nanoparticle is protected by an amine (amine compound). The particle diameter of the silver nanoparticles is, for example, 10 nm to 200 nm. A silver nanoparticle ink containing silver nanoparticles and a resin uniformly dispersed in a solvent at nanoscale can be easily produced using the silver nanoparticle dispersion of the present embodiment. In contrast to this, with a method for obtaining a high-viscosity silver nanoparticle ink by synthesizing silver nanoparticles and kneading the silver nanoparticles, a resin, and solvent, it is difficult to obtain the same effect as obtained with the method of the present embodiment. The term "particle diameter" means an average particle diameter. The average particle diameter of the silver nanoparticles can be calculated, for example, by the following method: The diameters of any number (for example, 50) of the silver nanoparticles observed in a transmission microscope image are calculated, and an average of the diameters can be considered the average particle diameter. The diameter of each silver nanoparticle observed in the transmission microscope image can be considered equal to the diameter of a circle having an area equal to the area of the silver nanoparticle.

(Heat Treatment)

A method for preparing the mixture (raw material mixture) containing the amine compound, resin, and silver salt is not particularly limited. The amine compound, resin, and silver salt are placed in a container and the mixture of them is stirred. The mixture is heated as necessary at a temperature of 20° C. to 50° C. while stirred. The complex compound is yielded in this manner. The formation of the complex compound can be known by changes in color and viscosity of the mixture (mixed liquid).

More specifically, it is also possible to mix the amine compound and resin (first stage), and then add the silver salt to the mixture obtained at the first stage and containing the amine compound and resin to yield the complex compound (second stage). This allows the amine compound and resin to be uniformly mixed beforehand. The mixture may be heated as necessary at a temperature of 20° C. to 50° C. in each stage. For example, in the first stage, the mixture containing the amine compound and resin is stirred for 10 minutes to 1 hour while heated at a temperature of 20° C. to 50° C. For example, in the second stage, the mixture containing the amine compound, resin, and silver salt is stirred for 5 minutes to 1 hour while heated at a temperature of 20° C. to 50° C. The complex compound is yielded in this manner.

Mixing the amine compound, resin, and silver salt yields the complex compound. In other words, part of the silver salt forms a silver-amine complex. When the silver salt is silver oxalate, a silver oxalate-amine complex is formed. By stirring the mixture containing the silver-amine complex under heating at a temperature of 90° C. to 120° C. for 3 to 20 minutes, the silver nanoparticle dispersion can be obtained. Since the mixture is heated at a temperature lower than the decomposition temperature of the resin, decomposition of the resin can be prevented.

The raw material mixture may only contain the amine compound, resin, and silver salt. The raw material mixture may only contain the amine compound, resin, silver salt, and a fatty acid described later. The method of the present embodiment is what is called a complex decomposition method, and thus no reducing agent for reduction of silver is necessary.

According to the liquid-phase reduction method described in Patent Literature 1, silver nanoparticles are formed by adding a silver salt little by little to an aqueous solution containing a reducing agent. Therefore, not only does it take time to produce the silver nanoparticles, but a large amount of the aqueous solution containing the highly toxic reducing agent remains as a waste liquid. The complex decomposition method, on the other hand, can produce the silver nanoparticles having uniform particle diameters in a short time. Besides, since no reducing agent is used, the issue of waste liquid is less likely to arise. Furthermore, according to the liquid-phase reduction method, the silver nanoparticles are synthesized from the aqueous solution. This means that the solvent in which the silver nanoparticles are dispersed is an aqueous solvent. The complex decomposition method, on the other hand, does not use water as a solvent, which enables production of water-free silver nanoparticles that are soluble in various organic solvents. Since no water is used, the silver nanoparticles produced according to the complex decomposition method are suitable as a material for conductive lines of electronic components.

(Silver Salt)

The silver salt (silver compound) is a raw material for the silver nanoparticles. The silver salt can be a material easily decomposed by heating to produce metal silver. The silver salt may be either an organic salt of silver or an inorganic salt of silver. They may be used in combination. Specifically, at least one selected from the group consisting of fatty acid silver, silver acetate, silver benzoate, silver citrate, silver carbonate, silver oxide, silver oxalate, silver sulfate, silver nitrate, and silver fluoride can be used. Among these, silver oxalate, which is less likely to produce impurities, is desirably used.

(Amine Compound)

The amine compound serves as a protective agent covering the silver nanoparticles. That is, the amine compound covers the surface of each silver nanoparticle and prevents fusion between the silver nanoparticles. The amine compound may be either a primary amine or a secondary amine. They may be used in combination. The amine compound may be an aliphatic amine. Specifically, the amine compound is, for example, a primary aliphatic amine. In particular, an alkylamine is desirably used. From the viewpoint of sinterability, the amine compound having a boiling point of 250° C. or lower is suitable for the present embodiment. Such an amine compound is apt to volatilize after desorbed from the silver nanoparticles by heating. In terms of achieving homogeneous reaction for synthesis of the silver nanoparticles, the melting point of the amine compound is desirably 20° C. or lower. The amine compound is typically a liquid at room temperature (25° C.).

Examples of the aliphatic amine include ethanolamine, diethanolamine, triethanolamine, and prop anolamine. Examples of the primary amine include butylamine, dipropylamine, dibutylamine, hexylamine, cyclohexylamine, heptylamine, 3-butoxypropylamine, octylamine, nonylamine, decylamine, dodecylamine, hexadecylamine, oleylamine, and octadecylamine. Among these, hexylamine or propanolamine, both of which are easily available, is desirably used.

The amine compound may be a diamine having a plurality of amino groups. In terms of achieving homogeneous reaction for synthesis of the silver nanoparticles, it is preferable for the diamine to have a melting point of 20° C. or lower. In terms of reaction homogeneity required for full complexation of the silver compound, the carbon number of the diamine is desirably 4 to 12. Examples of the diamine include N, N-dimethylethylenediamine, N, N-diethylethylenediamine, N, N-dibutylethylenediamine, N,N-dimethyl-1,3-propanediamine, N,N-diethyl-1,3-propanediamine, 3-(dibutylamino)propylamine, 2-diisopropylaminoethylamine, and dimethylaminoethoxypropylamine.

The above amine compounds may be used alone, or two or more thereof may be used in combination. The ratio of the amine compound in the mixture containing the amine compound, resin, and silver salt is not particularly limited. In an example, 0.5 mol to 10 mol, particularly 0.8 mol to 3 mol, of the amine compound is contained in the mixture with respect to 1 mol of the silver salt.

(Resin)

The resin serves to provide viscosity and/or viscoelasticity to the silver nanoparticle ink. In other words, the resin is added to the raw material mixture for forming the silver nanoparticles in order to control the viscosity of the silver nanoparticle ink. A resin uniformly miscible with the amine compound (particularly, an aliphatic amine) or a resin soluble in the amine compound (particularly, an aliphatic amine) can be suitably used. For example, at a temperature within the range of 20° C. to 50° C., the amine compound and the resin are mixed uniformly or the resin dissolves in the amine compound. Specifically, a liquid resin having viscosity at room temperature can be suitably used. In still another aspect, the resin can be a polymer exhibiting viscosity at a temperature within the range of 20° C. to 50° C. or a high molecular weight compound exhibiting viscosity at a temperature within the range of 20° C. to 50° C. If such a resin is contained in the raw material mixture, it is easy to provide viscosity and viscoelasticity to the silver nanoparticle ink. The raw material mixture may contain only one resin or may contain a plurality of resins. The term "high molecular weight compound" means an organic compound having a molecular weight of 500 or more.

Specific examples of the resin include epoxy, acrylic, polyimide, polyamide, polystyrene, polyethylene, polyester, and polyolefin. Particularly, resins categorized as a hydrocarbon polymer can be suitably used. These resins are on sale as a wide variety of additives, such as a thickener and surfactant, and are easily available. The ratio of the resin in the mixture containing the amine compound, resin, and silver salt is not particularly limited. In an example, 10 to 100 parts by weight of the resin is contained in the mixture with respect to 100 parts by weight of the silver salt (for example, silver oxalate). The degree of polymerization of a polymer is often unknown; thus, in the present embodiment, the amount of the resin used is expressed as the ratio of its weight to the silver salt. A desired viscosity can be obtained by suitably adjusting the molecular weight of the resin.

The raw material mixture for forming the complex compound may contain a fatty acid. The raw material mixture for forming the complex compound may further contain a thiol. Fatty acids and thiols form ionic bonds with silver, improving the dispersion stability of the silver nanoparticles. These additional materials can be mixed in the raw material mixture for yielding the complex compound. When the two-stage process is carried out as described previously, these additional materials can be mixed with the amine compound and resin in the first stage described previously.

(Fatty Acid)

An example of the fatty acid is an unsaturated fatty acid having an unsaturated bond. The fatty acid may be a carboxylic acid having a carboxyl group. Specifically, citric acid, malonic acid, cholic acid, deoxycholic acid, dehydrocholic acid, glycocholic acid, cholanoic acid, lithocholic acid, abietic acid, glycyrrhizic acid, crotonic acid, sapienic acid, oleic acid, eicosenoic acid, and linolenic acid can be used as the fatty acid. In particular, at least one selected from citric acid and oleic acid is desirably used. The above fatty acids may be used alone, or two or more thereof may be used in combination. The ratio of the fatty acid in the raw material mixture is not particularly limited. In an example, 0.01 mol to 1 mol, particularly 0.03 mol to 0.1 mol, of the fatty acid is contained in the raw material mixture with respect to 1 mol of the silver salt.

(Thiol)

Examples of the thiol include octadecanethiol, hexadecanethiol, and tetradecanethiol.

(Washing)

The silver nanoparticle dispersion obtained through a heat treatment includes impurities produced by a reduction reaction and raw materials not having participated in the reaction. In order to remove them, the silver nanoparticle dispersion is washed with an alcohol. For example, an alcohol having one to five times larger volume than the silver nanoparticle dispersion is added to the silver nanoparticle dispersion. The mixture is then stirred and centrifuged, and the resultant supernatant is removed. This operation is repeated at least twice. The resultant precipitate can be collected as a purified silver nanoparticle dispersion. The precipitate obtained after the removal of the supernatant may be dried to remove the alcohol as a washing solvent.

(Production of Silver Nanoparticle Ink)

A silver nanoparticle ink having viscosity suitable for various printing methods can be obtained by mixing the silver nanoparticles (silver nanoparticle dispersion) and an organic solvent. As the organic solvent, a hydrocarbon solvent such as toluene, xylene, cyclohexane, octane, butane, dodecane, and tetradecane can be used. Depending on the resin used, a ketone organic solvent can be used. Examples of the ketone organic solvent include acetone, methyl ethyl ketone (MEK), methyl isobutyl ketone (MIBK), diisobutyl ketone (DIBK), isophorone, and cyclohexanone.

An organic solvent having a boiling point of 200° C. or higher can be used as the organic solvent of the silver nanoparticle ink. Using an organic solvent having a high boiling point can prevent a defect such as clogging caused by drying of the ink. The upper limit of the boiling point of the organic solvent is not particularly limited. The upper limit is, for example, 250° C.

Specifically, when the silver nanoparticle ink of the present embodiment is employed in a printing device, an organic solvent that is less volatile at ordinary temperature and ordinary pressure is suitably used. Examples of the organic solvent that is less volatile at ordinary temperature and ordinary pressure include dodecane, tetradecane, and isophorone. It is also possible to prepare a poorly volatile solvent by mixing a volatile solvent and a nonvolatile solvent and use the poorly volatile solvent in the production of the ink. For example, DBS (sodium alkylbenzene sulfonate) and paraffin oil (liquid paraffin) are mixed to obtain a poorly volatile solvent. DBS is a volatile solvent. Paraffin oil is a nonvolatile solvent and has, for example, a boiling point of 300° C. or higher. The upper limit of the boiling point of the paraffin oil is, for example, 350° C. Depending on the type of the printing device, a solvent having a boiling point as low as 150° C. or less (low boiling point solvent) may be suitable. In such a case, the silver nanoparticle ink can be produced using the low boiling point solvent. Alternatively, the silver nanoparticle ink may be produced using a mixed solvent of the low boiling point solvent and a different solvent. Examples of the low boiling point solvent include methanol, ethanol, isopropyl alcohol, toluene, xylene, tetrahydrofuran, and methyl ethyl ketone. The lower limit of the boiling point of the low boiling point solvent is, for example, 60° C.

The organic solvent desirably contains an organic solvent (for example, an aromatic compound) having a surface free energy of 20 mN/m to 50 mN/m at room temperature (25° C.). The use of an organic solvent having a relatively high surface free energy allows formation of fine conductive lines and effective prevention of coffee stain effect. The "coffee stain effect" refers to a phenomenon where a coating film has a higher concentration of a solute (e.g., silver nanoparticles) in its outer peripheral portion than in its central portion, with the result that a conductive line obtained by sintering the coating film has a greater thickness in its outer peripheral portion than in its central portion. The surface free energy of a liquid can be calculated by the Wilhelmy method for measuring the force required to raise a plate immersed in the liquid.

According to the present embodiment, a resin component is included in the silver nanoparticle dispersion. The resin component enables the silver nanoparticles to be dispersed uniformly and easily in various organic solvents ranging from nonpolar to polar solvents. That makes it possible to provide a silver nanoparticle ink having a surface energy optimal for various printing devices.

The silver nanoparticle ink of the present embodiment can be used in known methods such as spin coating, bar coating, spray coating, inkjet printing, screen printing, gravure offset printing, and letterpress reverse printing.

The silver nanoparticle ink produced according to the method of the present embodiment has a high viscosity of 1 Pa·s or more that is suitable for such printing methods as screen printing and gravure offset printing. A silver nanoparticle ink having a low viscosity of 10 mPa·s or less that is suitable for such printing methods as inkjet printing and letterpress reverse printing can be obtained by diluting the high-viscosity silver nanoparticle ink with an appropriate organic solvent. As described above, according to the present embodiment, the viscosity of the silver nanoparticle ink can be controlled over a wide range. The term "viscosity" in this specification means the viscosity at room temperature (25° C.).

When a silver nanoparticle ink exhibiting a high viscosity of 1 Pa·s or more and a viscoelasticity of a non-Newtonian liquid is needed, such as in the case of screen printing or gravure offset printing, a resin may further be added to the silver nanoparticle ink obtained through the above washing step. Examples of the resin used in the production of the high-viscosity ink include an acrylic resin and epoxy resin. The resin may be mixed directly with the silver nanoparticle ink. The resin may also be dissolved in the above organic solvent, and the resultant resin solution may be mixed with the silver nanoparticle ink.

After a coating film is formed using the silver nanoparticle ink of the present embodiment, the coating film is sintered to sinter the silver nanoparticles. The sintering temperature is, for example, 250° C. or lower, 200° C. or lower, or 150° C. or lower. The silver nanoparticles have good low-temperature sinterability. The silver nanoparticle ink exhibits high electrical conductivity when sintered at a low temperature. The coating film formed using the silver nanoparticle ink of the present embodiment can be sintered also by photoirradiation using, for example, a xenon flash lamp.

With the use of the silver nanoparticle ink of the present embodiment, it is possible to form electrically-conductive structures such as conductive lines and electrodes that have a sufficiently low resistivity of, for example, $50 \times 10^{-6}$ Ω·cm or less, desirably $3 \times 10^{-6}$ to $10 \times 10^{-6}$ Ω·cm, at room temperature (25° C.). Thus, the silver nanoparticle ink of the present embodiment can be used in production of various electronic components such as thin-film transistors, integrated circuits including thin-film transistors, touch panels, RFIDs, flexible displays, organic ELs, circuit boards, and sensor devices.

(Thin-Film Transistor)

Figure 15:
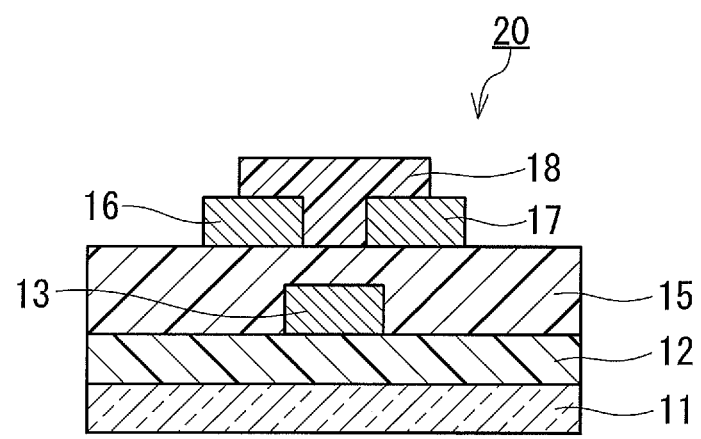
FIG. 15 is a schematic cross-sectional view of a thin-film transistor.

A thin-film transistor having a structure shown in FIG. 15 can be produced using the silver nanoparticle ink of the present embodiment. A thin-film transistor 20 includes a substrate 11, an underlayer 12, a gate electrode 13, a gate insulating film 15, a source electrode 16, a drain electrode 17, and an organic semiconductor layer 18. The underlayer 12 is formed of, for example, an insulating resin. On the underlayer 12, the gate electrode 13 is formed. The gate electrode 13 can be formed by applying and sintering the silver nanoparticle ink on the underlayer 12. The gate insulating film 15 covers the gate electrode 13. On the gate insulating film 15, the source electrode 16 and the drain electrode 17 are formed. The source electrode 16 and the drain electrode 17 can be formed by applying and sintering the silver nanoparticle ink on the gate insulating film 15.

EXAMPLES

Hereinafter, the present invention will be described specifically with reference to examples. The present invention is not limited to the examples given below. Physical properties of the examples were measured using the following instruments.

(1) Content of Silver

The content of silver was determined by carrying out thermogravimetric and differential thermal analysis (TG/DTA) using a thermogravimetric analyzer (SDTQ 600 manufactured by TA Instruments Japan Inc.).

(2) Viscosity

The viscosity was measured using a rotational viscometer (DV2T manufactured by Brookfield Engineering Laboratories, Inc.).

(3) Printability

A conductive line having a line width of 50 μm was printed using a gravure offset printer (manufactured by MT TECH CO., LTD.), and an ink residue left on a blanket and the shape of the printed conductive line were observed.

(4) Observation of Shape

The shape of the printed conductive line was observed using a laser microscope (LEXT OLS 4500 manufactured by Olympus Corporation).

Example 1

An amount of 5.78 g of n-hexylamine, 3.89 g of N,N-dimethyl-1,3-diaminopropane, 0.251 g of oleic acid, and 1.9 g of SOLSPERSE 8000 ("SOLSPERSE" is a registered trademark) of The Lubrizol Corporation as a resin were put in a container, and the resultant solution was stirred for 15 minutes at 40° C. The resin was dissolved in the mixed liquid of the amine compounds and fatty acid. Next, 7.6 g of silver oxalate was added to the container and the stirring was continued. The solution turned into a gel 15 minutes after the addition of the silver oxalate. Thus the heating temperature was raised to 110° C. and the heating and stirring were further continued. The solution then turned brown, generated bubbles, and later turned shiny bluish-purple. After the end of the generation of bubbles was confirmed, the heating and stirring were stopped and the solution was cooled down to ordinary temperature. Subsequently, 50 ml of methanol was added to the solution, which was stirred. This was followed by three repetitions of the operation of centrifuging the solution for five minutes at 2000 rpm and removing the resultant supernatant. After the last removal of the supernatant, the precipitate was collected. The precipitate was dried in air at a temperature of 23° C. and a humidity of 30% for 24 hours or more. As a result, a pasty silver nanoparticle dispersion (silver paste) with high viscosity was obtained. The content of silver in the silver nanoparticle dispersion was 92.2 wt %. FIG. 1 shows a TEM image of the silver nanoparticles of Example 1. The silver nanoparticles had a particle diameter of 10 nm to 20 nm. The silver nanoparticle dispersion was diluted with tetradecane so that the weight concentration of silver would be 82%, and thus a silver nanoparticle ink having a viscosity of about 1 Pa·s was obtained.

Example 2

Silver nanoparticles were synthesized and a silver nanoparticle dispersion was obtained in the same manner as in Example 1, except for using 1.9 g of SOLSPERSE 16000 of The Lubrizol Corporation as a resin instead of SOLSPERSE 8000. The content of silver in the silver nanoparticle dispersion was 90.3 wt %. The silver nanoparticle dispersion was diluted with tetradecane so that the weight concentration of silver would be 82%, and thus a silver nanoparticle ink having a viscosity of about 1 Pa·s was obtained.

Example 3

Figure 2:
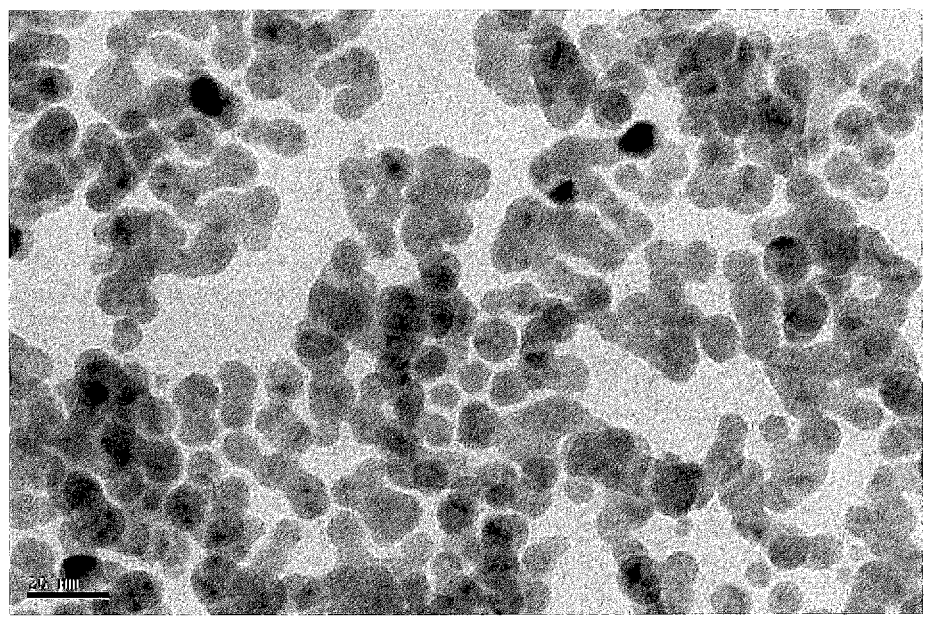
FIG. 2 shows a TEM image of silver nanoparticles of Example 3.

Silver nanoparticles were synthesized and a silver nanoparticle dispersion was obtained in the same manner as in Example 1, except for using 1.9 g of polyvinylpyrrolidone (K-30) of Tokyo Chemical Industry Co., Ltd. as a resin instead of SOLSPERSE 8000. FIG. 2 shows a TEM image of the silver nanoparticles of Example 3. The silver nanoparticles had a particle diameter of 10 nm to 20 nm. The silver nanoparticle dispersion was diluted with toluene or tetradecane. The silver nanoparticles were uniformly dispersible in both the toluene and tetradecane.

The silver nanoparticles were determined to be uniformly dispersed in the solvent of the silver nanoparticle ink when it was visually confirmed that: the silver nanoparticles were dissolved in the solvent to such a degree that no precipitate was observable; and secondary aggregation of the silver nanoparticles did not occur.

Example 4

Figure 3:
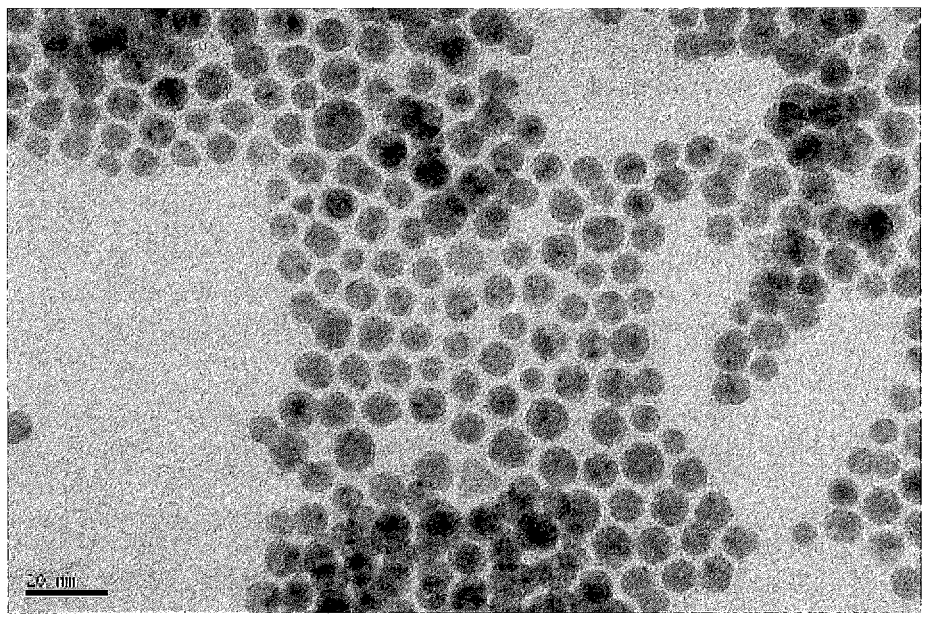
FIG. 3 shows a TEM image of silver nanoparticles of Example 4.

Silver nanoparticles were synthesized and a silver nanoparticle dispersion was obtained in the same manner as in Example 1, except for using 1.9 g of polyvinylphenol of Sigma-Aldrich Co., LLC. as a resin instead of SOLSPERSE 8000. FIG. 3 shows a TEM image of the silver nanoparticles of Example 4. The silver nanoparticles had a particle diameter of 10 nm to 20 nm. The silver nanoparticle dispersion was diluted with toluene or tetradecane. The silver nanoparticles were uniformly dispersible in both the toluene and tetradecane.

Example 5

Figure 4:
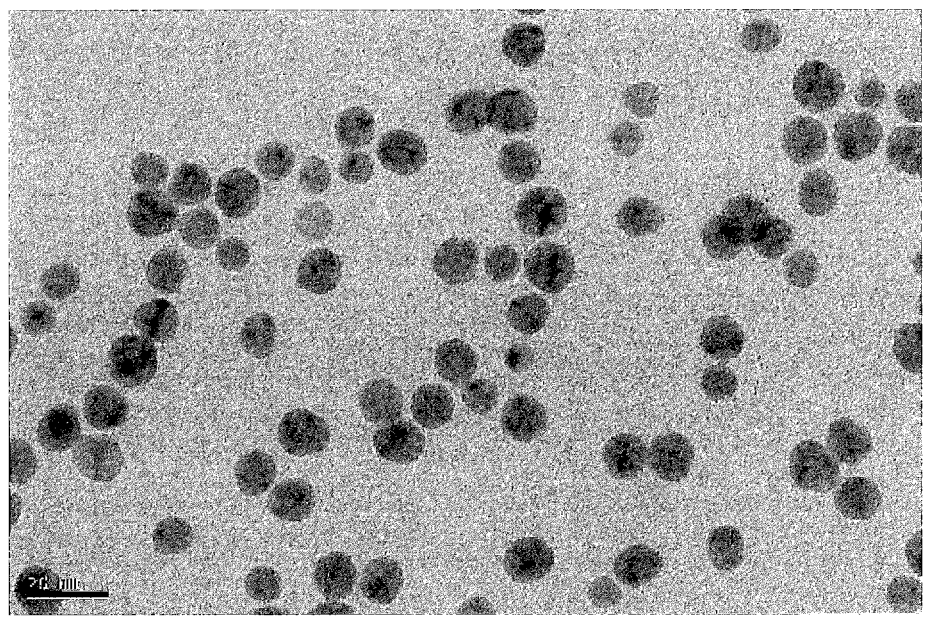
FIG. 4 shows a TEM image of silver nanoparticles of Example 5.

Silver nanoparticles were synthesized and a silver nanoparticle dispersion was obtained in the same manner as in Example 1, except for using 1.9 g of polystyrene of Sigma-Aldrich Co., LLC. as a resin instead of SOLSPERSE 8000. FIG. 4 shows a TEM image of the silver nanoparticles of Example 5. The silver nanoparticles had a particle diameter of 10 nm to 20 nm. The silver nanoparticle dispersion was diluted with toluene or tetradecane. The silver nanoparticles were uniformly dispersible in both the toluene and tetradecane.

Example 6

Figure 5:
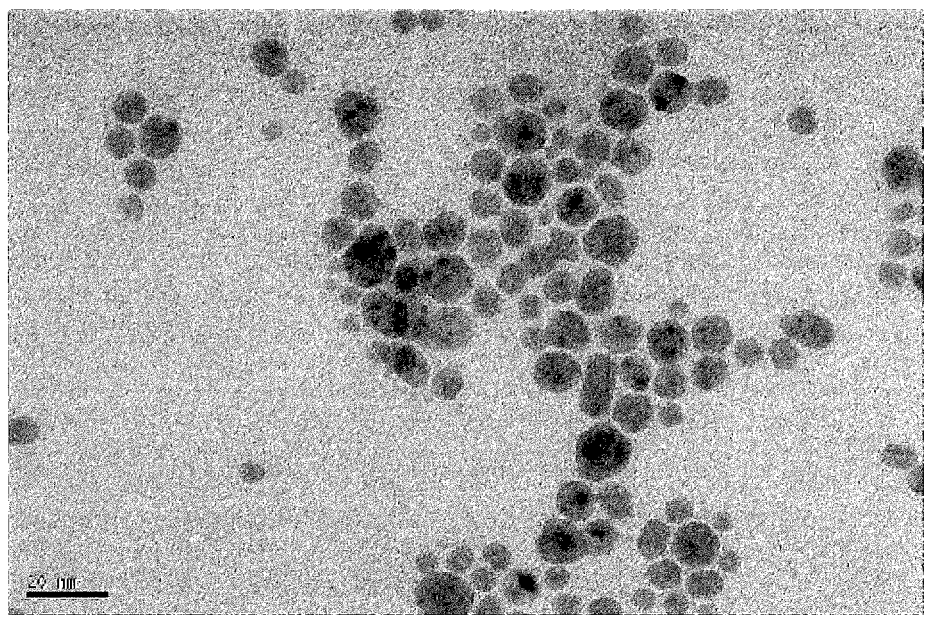
FIG. 5 shows a TEM image of silver nanoparticles of Example 6.

Silver nanoparticles were synthesized and a silver nanoparticle dispersion was obtained in the same manner as in Example 1, except for using 1.9 g of melamine resin of Sigma-Aldrich Co., LLC. as a resin instead of SOLSPERSE 8000. FIG. 5 shows a TEM image of the silver nanoparticles of Example 6. The silver nanoparticles had a particle diameter of 10 nm to 20 nm. The silver nanoparticle dispersion was diluted with toluene or tetradecane. The silver nanoparticles were uniformly dispersible in both the toluene and tetradecane.

Example 7

Silver nanoparticles were synthesized and a silver nanoparticle dispersion was obtained in the same manner as in Example 1, except for using 1.9 g of Span 85 ("Span" is a registered trademark) of KANTO CHEMICAL CO., INC.

instead of SOLSPERSE 8000. The content of silver in the silver nanoparticle dispersion was 93.0 wt %. The silver nanoparticle dispersion was diluted with tetradecane so that the weight concentration of silver would be 82%, and thus a silver nanoparticle ink having a viscosity of about 1 Pa·s was obtained.

Example 8

Silver nanoparticles were synthesized and a silver nanoparticle dispersion was obtained in the same manner as in Example 1, except for using 4.42 g of N, N-dibutylethylenediamine instead of N,N-dimethyl-1,3-diaminopropane. The silver nanoparticle dispersion was diluted with tetradecane, and thus a silver nanoparticle ink having a viscosity of about 1 Pa·s was obtained.

Example 9

Figure 6:
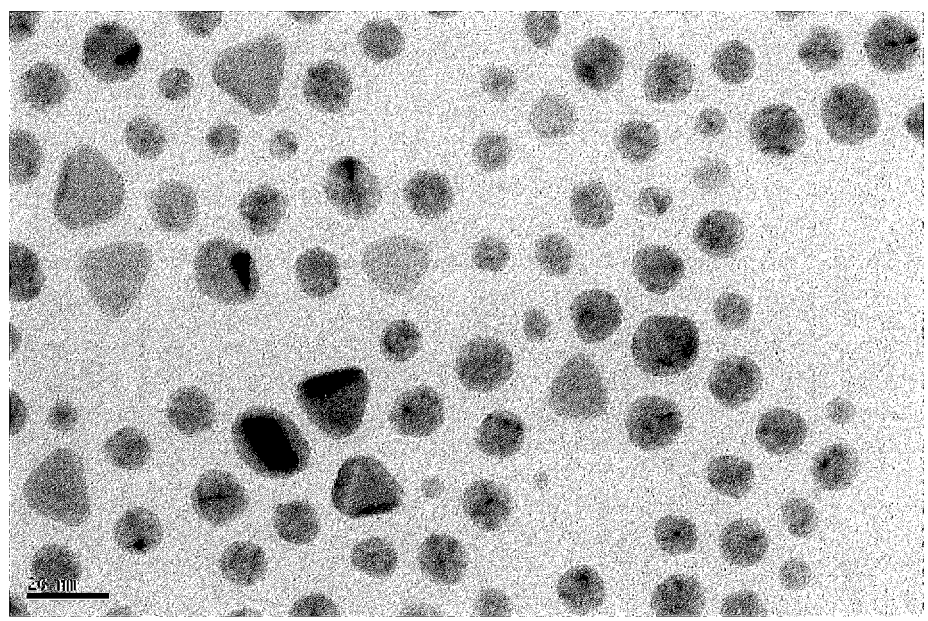
FIG. 6 shows a TEM image of silver nanoparticles of Example 7.

Silver nanoparticles were synthesized and a silver nanoparticle dispersion was obtained in the same manner as in Example 1, except for not using N,N-dimethyl-1,3-diaminopropane. FIG. 6 shows a TEM image of the silver nanoparticles of Example 9. The silver nanoparticles had a particle diameter of 10 nm to 20 nm. The silver nanoparticle dispersion was diluted with tetradecane, and thus a silver nanoparticle ink having a viscosity of about 1 Pa·s was obtained.

Example 10

Figure 7:
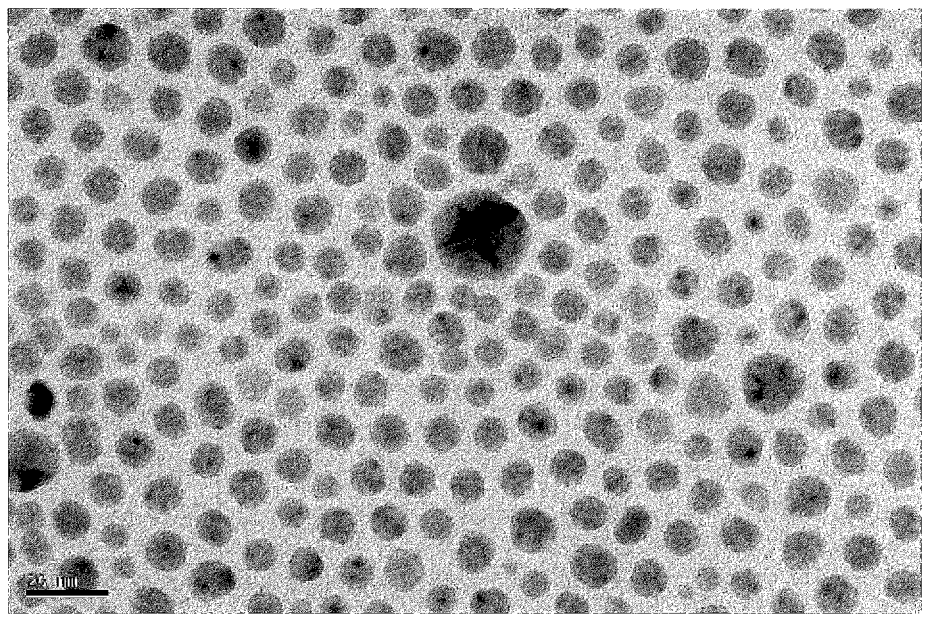
FIG. 7 shows a TEM image of silver nanoparticles of Example 10.

Silver nanoparticles were synthesized and a silver nanoparticle dispersion was obtained in the same manner as in Example 1, except for not using n-hexylamine. FIG. 7 shows a TEM image of the silver nanoparticles of Example 10. The silver nanoparticles had a particle diameter of 10 nm to 20 nm. The silver nanoparticle dispersion was diluted with tetradecane, and thus a silver nanoparticle ink having a viscosity of about 1 Pa·s was obtained.

Example 11

Figure 8:
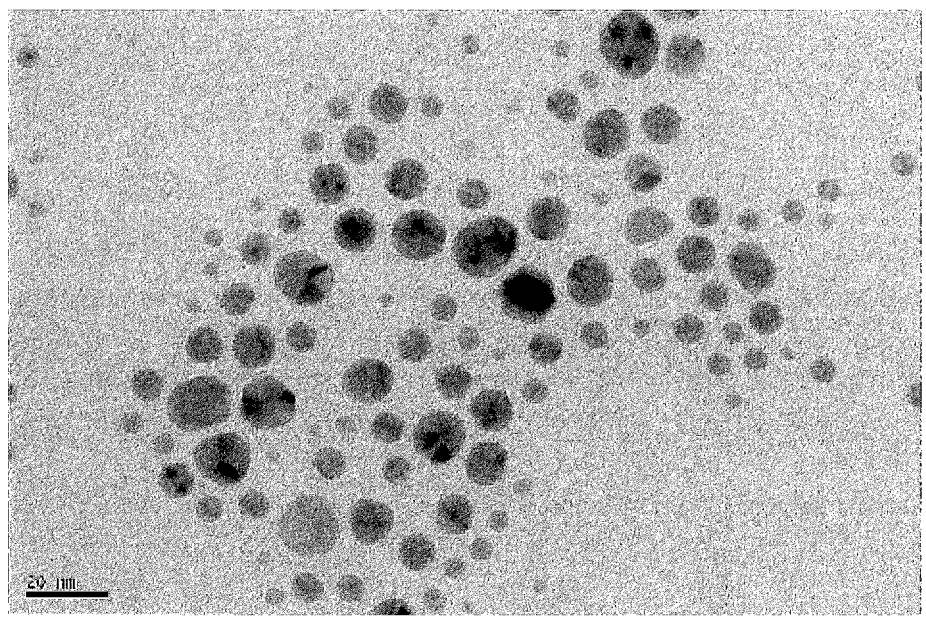
FIG. 8 shows a TEM image of silver nanoparticles of Example 11.

Silver nanoparticles were synthesized and a silver nanoparticle dispersion was obtained in the same manner as in Example 1, except for not using n-hexylamine and using 4.42 g of N,N-dibutylethylenediamine instead of N,N-dimethyl-1,3-diaminopropane. FIG. 8 shows a TEM image of the silver nanoparticles of Example 11. The silver nanoparticles had a particle diameter of 10 nm to 20 nm. The silver nanoparticle dispersion was diluted with tetradecane, and thus a silver nanoparticle ink having a viscosity of about 1 Pa·s was obtained.

Example 12

Figure 9:
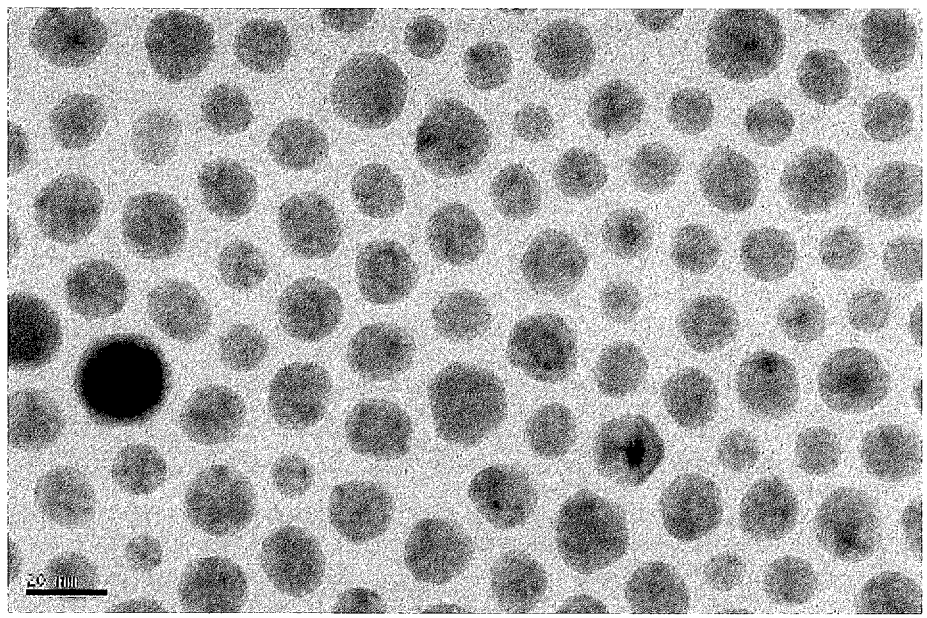
FIG. 9 shows a TEM image of silver nanoparticles of Example 12.

Silver nanoparticles were synthesized and a silver nanoparticle dispersion was obtained in the same manner as in Example 1, except for not using oleic acid. FIG. 9 shows a TEM image of the silver nanoparticles of Example 12. The silver nanoparticles had a particle diameter of 10 nm to 30 nm. The silver nanoparticle dispersion was diluted with tetradecane, and thus a silver nanoparticle ink having a viscosity of about 1 Pa·s was obtained.

Example 13

Silver nanoparticles were synthesized and a silver nanoparticle dispersion was obtained in the same manner as in Example 8, except for not using oleic acid. The silver nanoparticle dispersion was diluted with tetradecane, and thus a silver nanoparticle ink having a viscosity of about 1 Pa·s was obtained.

Example 14

Figure 10:
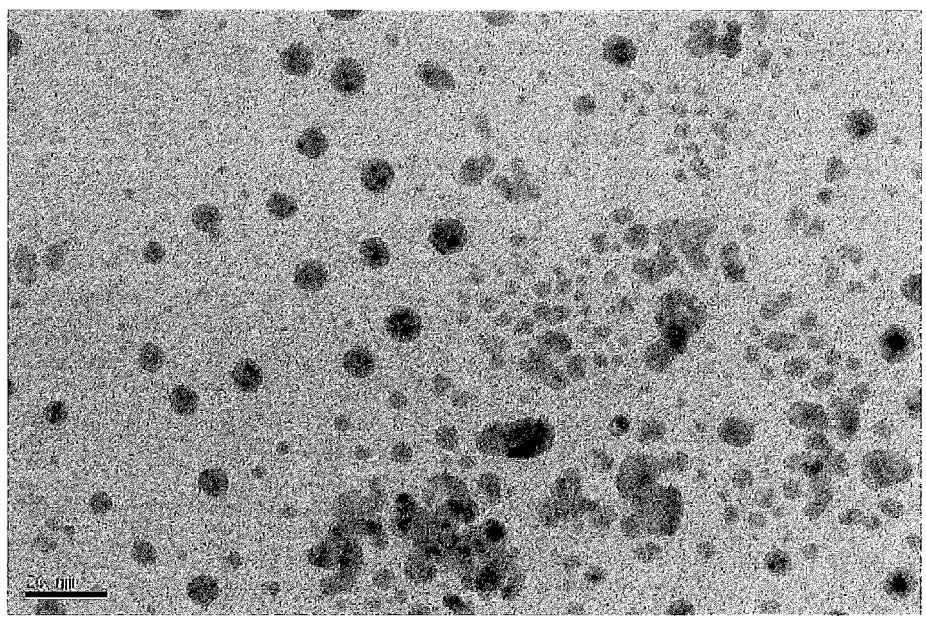
FIG. 10 shows a TEM image of silver nanoparticles of Example 14.

Silver nanoparticles were synthesized and a silver nanoparticle dispersion was obtained in the same manner as in Example 9, except for not using oleic acid. FIG. 10 shows a TEM image of the silver nanoparticles of Example 14. The silver nanoparticles had a particle diameter of 10 nm to 20 nm. The silver nanoparticle dispersion was diluted with toluene or tetradecane. The silver nanoparticles were uniformly dispersible in both the toluene and tetradecane.

Example 15

Figure 11:
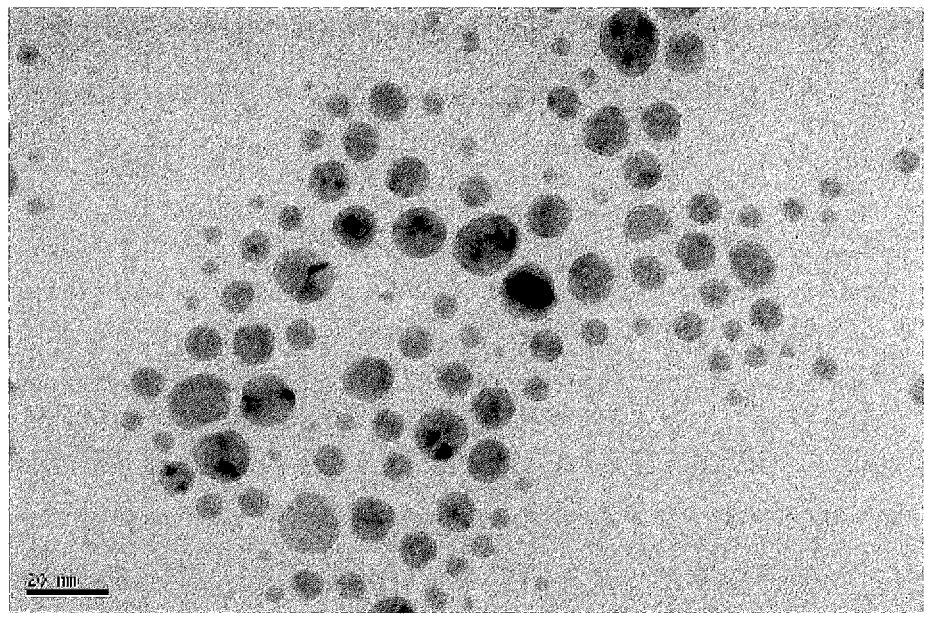
FIG. 11 shows a TEM image of silver nanoparticles of Example 15.

Silver nanoparticles were synthesized and a silver nanoparticle dispersion was obtained in the same manner as in Example 10, except for not using oleic acid. FIG. 11 shows a TEM image of the silver nanoparticles of Example 15. The silver nanoparticles had a particle diameter of 10 nm to 20 nm. The silver nanoparticle dispersion was diluted with toluene or tetradecane. The silver nanoparticles were uniformly dispersible in both the toluene and tetradecane.

Example 16

Silver nanoparticles were synthesized and a silver nanoparticle dispersion was obtained in the same manner as in Example 11, except for not using oleic acid. The silver nanoparticle dispersion was diluted with toluene or tetradecane. The silver nanoparticles were uniformly dispersible in both the toluene and tetradecane. The results for Examples 1 to 16 confirmed that silver nanoparticles are synthesizable by complexation of a mixture of an amine compound and silver salt and decomposition of the resultant complex by heating. The results for Examples 8 to 16 confirmed that a silver complex is able to be formed from any one of (i) a mixture containing an amine compound, silver salt, and resin, (ii) a mixture containing an amine compound, silver salt, resin, and fatty acid, and (iii) a mixture of a silver salt, resin, and fatty acid, and that silver nanoparticles are synthesizable by decomposition of the silver complex by heating.

Comparative Example 1

A silver nanoparticle ink was produced without any resin. Specifically, 5.78 g of n-hexylamine, 4.77 g of n-dodecylamine, 3.89 g of N,N-dimethyl-1,3-diaminopropane, and 0.251 g of oleic acid were put in a container, and the resultant solution was stirred for 15 minutes at 40° C. Next, 7.6 g of silver oxalate was added to the container and the stirring was continued at 40° C. The solution turned into a gel about 20 minutes after the addition of the silver oxalate. Thus the heating temperature was raised to 110° C. and the heating and stirring were further continued. The solution then turned brown, generated bubbles, and later turned shiny blue. After the end of the generation of bubbles was confirmed, the heating and stirring were stopped and the solution was cooled down to ordinary temperature. Subsequently, 50 ml of methanol was added to the solution, which was stirred. This was followed by three repetitions of the operation of centrifuging the solution for five minutes at 2000 rpm and removing the resultant supernatant. After the last removal of the supernatant, the precipitate was vacuum-dried in a bell jar for three minutes. The resultant precipitate was a cake-like agglomerate (silver paste) of silver nanoparticles. The content of silver in the precipitate was 93.4 wt %.

The silver paste was gradually diluted with tetradecane so that the weight concentration of silver would be 82%. The viscosity of the silver paste declined steeply and was unable to be adjusted to be suitable for gravure offset printing.

Comparative Example 2

A resin (SOLSPERSE 8000) was dissolved in a solvent (tetradecane) to saturation to prepare a mixed liquid of the solvent and resin. The mixed liquid was added to and sufficiently mixed with the silver paste synthesized in Comparative Example 1 so that the weight concentration of silver would be 82%. The viscosity of the silver paste declined to as low as about 400 mPa·s.

[Electrode Performance]

A thin film was formed on a glass substrate by spin coating using the silver nanoparticle ink of Example 1. After the thin film was sintered at a predetermined temperature, the volume resistivity of the thin film was measured. Table 1 shows the results. At a sintering temperature of 250° C. or more, a resistivity of less than 50 µΩ·cm was achieved.

TABLE 1

| Sintering temperature (° C.) | Resistivity (µΩ · cm) |
| --- | --- |
| 220 | 2022939500 |
| 230 | 2329.22 |
| 240 | 60.60 |
| 250 | 37.59 |
| 260 | 26.28 |
| 300 | 13.33 |

[Dispersibility of Silver Nanoparticles in Various Solvents]

The silver nanoparticles of Example 1 were dispersed in various solvents to check the dispersibility thereof. Specifically, the silver nanoparticles of Example 1 were dispersed in isophorone, tetradecane, methyl ethyl ketone, dodecane, n-octane, mesitylene, p-cymene, xylene, tetralin, 1-decanol, 1-octanol, 1-butanol, and liquid paraffin. The dispersibility of the silver nanoparticles of Example 1 in these solvents was good. It was possible to carry out gravure offset printing with the silver nanoparticle inks prepared using solvents having a relatively high boiling point, such as isophorone, tetradecane, tetralin, 1-decanol, and liquid paraffin.

[Gravure Offset Printing]

Figure 12:
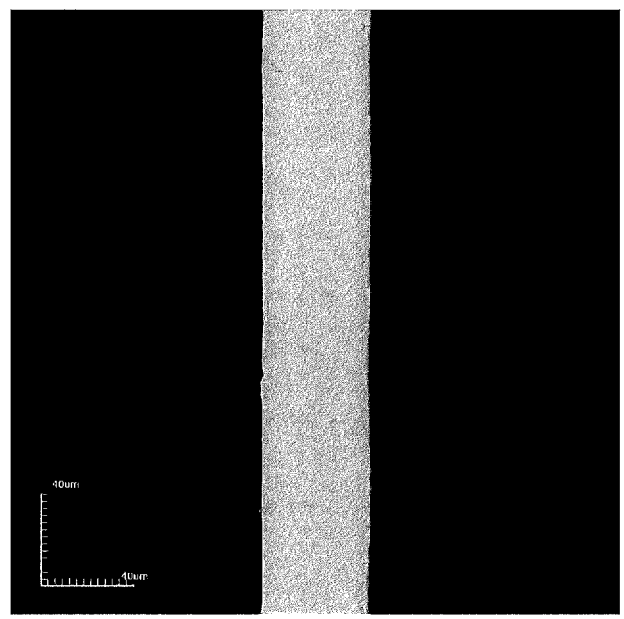
FIG. 12 shows a laser microscope image of a conductive line formed by gravure offset printing using a silver nanoparticle ink of Example 1.

Printing tests were carried out using the silver nanoparticle inks of Examples 1, 2, and 7 for gravure offset printing. In every case, a conductive line having a line width of 45 to 48 µm was able to be formed with a plate width of 50 µm. FIG. 12 shows the result of observing the conductive line formed using the silver nanoparticle ink of Example 1 with a laser microscope. It was also possible to carry out gravure offset printing using the silver nanoparticle inks of Examples 2 and 7.

[Inkjet Printing]

Figure 13:
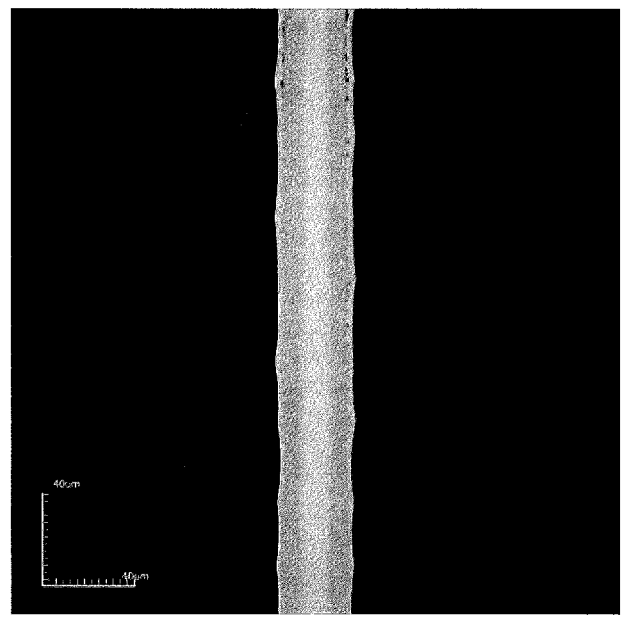
FIG. 13 shows a laser microscope image of a conductive line formed by inkjet printing using a silver nanoparticle ink obtained by diluting the silver nanoparticle ink of Example 1.
Figure 14:
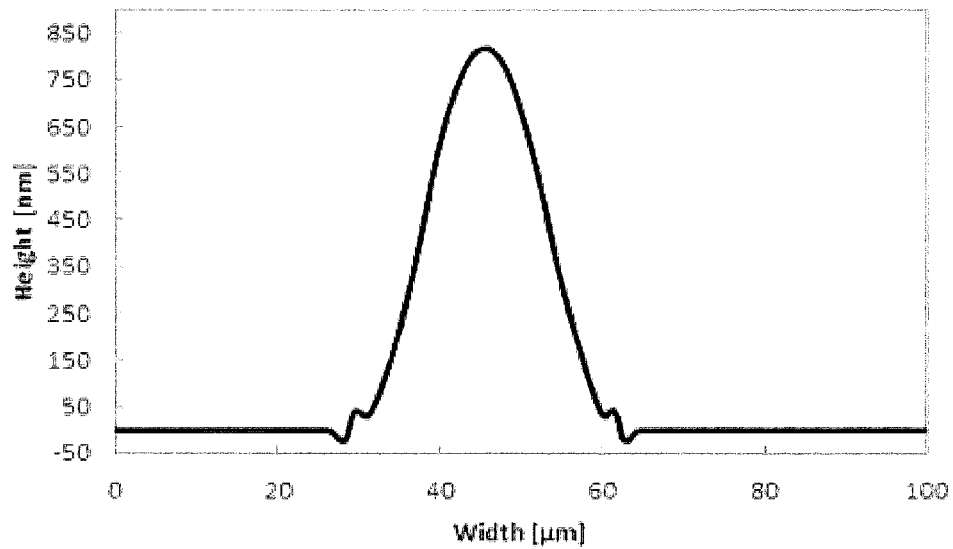
FIG. 14 shows a cross-sectional profile of the conductive line of FIG. 13.

A thin film of Teflon (AF1600 manufactured by Du Pont-Mitsui Fluorochemicals Company, Ltd.) ("Teflon" is a registered trademark) was formed on a glass substrate by spin coating. The surface of the thin film was made to be lyophilic by an oxygen plasma treatment. The silver nanoparticle ink of Example 1 was diluted with tetradecane so that the weight concentration of silver would be 30%, and thus a low-viscosity silver nanoparticle ink was obtained. A test for film formation by inkjet printing was conducted with an inkjet printer (Materials Printer DMP-2831 manufactured by FUJIFILM Dimatix, Inc.) using the silver nanoparticle ink. The silver nanoparticle ink was charged into a 10-picoliter ink cartridge. A conductive line was drawn on the glass substrate having the lyophilic Teflon thin film by means of the inkjet printer. FIG. 13 shows a laser microscope image of the conductive line. FIG. 14 shows a cross-sectional profile of the conductive line measured with the laser microscope. A conductive line having a width of 30 µm was able to be drawn by inkjet printing using the silver nanoparticle ink of Example 1.

The invention claimed is:

1. A method for producing a silver nanoparticle dispersion, comprising the steps of:
   mixing an amine compound, a resin, a fatty acid, and a silver salt to yield a complex compound; and
   heating and decomposing the complex compound to form silver nanoparticles,
   wherein the mixing comprises:
   a first stage of mixing the amine compound, the resin, and the fatty acid to yield a mixture; and a second stage of adding the silver salt to the mixture to yield the complex compound.

2. The method for producing a silver nanoparticle dispersion according to claim 1, wherein the amine compound further comprises an aliphatic amine.

3. The method for producing a silver nanoparticle dispersion according to claim 2, wherein the aliphatic amine is a primary amine.

4. The method for producing a silver nanoparticle dispersion according to claim 1, wherein the resin comprises a polymer exhibiting viscosity at a temperature within the range of 20° C. to 50° C. or a high molecular weight compound exhibiting viscosity at a temperature within the range of 20° C. to 50° C.

5. The method for producing a silver nanoparticle dispersion according to claim 1, wherein the silver salt comprises at least one selected from the group consisting of silver oxalate and silver carbonate.

6. The method for producing a silver nanoparticle dispersion according to claim 1, wherein a mixture comprising the amine compound, the resin, and the silver salt further comprises a thiol.

7. The method for producing a silver nanoparticle dispersion according to claim 1, wherein the amine compound comprises a diamine.

8. The method for producing a silver nanoparticle dispersion according to claim 7, wherein the diamine comprises at least one selected from the group consisting of N,N-dimethylethylenediamine, N,N-diethylethylenediamine, N,N-dibutylethylenediamine, N,N-dimethyl-1,3-propanediamine, N,N-diethyl-1,3-propanediamine, 3-(dibutylamino) propylamine, 2-diisopropylaminoethylamine and dimethylaminoethoxypropylamine.

9. A method for producing a silver nanoparticle ink, comprising the steps of:
   producing a silver nanoparticle dispersion by the method according to claim 1; and
   mixing the silver nanoparticle dispersion and an organic solvent.

10. The method for producing a silver nanoparticle ink according to claim 9, wherein the organic solvent comprises an organic solvent having a boiling point of 200° C. or higher.

11. The method for producing a silver nanoparticle ink according to claim 9, wherein the organic solvent comprises an aromatic compound having a surface free energy of 20 mN/m to 50 mN/m.

12. A method for producing an electrode, comprising the steps of:
 forming a coating film using a silver nanoparticle ink produced by the method according to claim 9; and
 sintering the coating film.

13. A method for producing a thin-film transistor, comprising the steps of:
 forming a coating film using a silver nanoparticle ink produced by the method according to claim 9; and
 sintering the coating film to form an electrode.

\* \* \* \* \*